US012434568B2

(12) United States Patent
Yoo et al.

(10) Patent No.: US 12,434,568 B2
(45) Date of Patent: Oct. 7, 2025

(54) METHOD FOR COMPENSATING ALTERNATING CURRENT CABLE LOSS

(71) Applicant: GM Global Technology Operations LLC, Detroit, MI (US)

(72) Inventors: Anno Yoo, Rochester, MI (US); Sangyeop Kwak, Orion Charter Township, MI (US); Nikhil Deshpande, Auburn Hills, MI (US); Brent Steven Gagas, Pleasant Ridge, MI (US); Vinod Chowdary Peddi, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 18/504,454

(22) Filed: Nov. 8, 2023

(65) Prior Publication Data

US 2025/0145015 A1 May 8, 2025

(51) Int. Cl.
*B60L 15/20* (2006.01)
*H02P 27/06* (2006.01)

(52) U.S. Cl.
CPC .............. *B60L 15/20* (2013.01); *H02P 27/06* (2013.01)

(58) Field of Classification Search
CPC ................................. B60L 15/20; H02P 27/06
See application file for complete search history.

(56) References Cited

U.S. PATENT DOCUMENTS

| | | | | |
|---|---|---|---|---|
| 10,658,965 | B2 * | 5/2020 | Minegishi | B60L 50/51 |
| 10,876,393 | B2 * | 12/2020 | Rendusara | F04D 15/0088 |
| 11,750,057 | B2 * | 9/2023 | Selvaraj | H02P 23/26 310/87 |
| 12,341,398 | B2 * | 6/2025 | Selvaraj | H02P 25/022 |
| 2017/0089192 | A1 * | 3/2017 | Rendusara | F04D 13/10 |
| 2019/0214931 | A1 * | 7/2019 | Minegishi | B60L 3/003 |
| 2020/0321824 | A1 * | 10/2020 | Selvaraj | F04C 13/008 |
| 2023/0361645 | A1 * | 11/2023 | Selvaraj | F04D 15/0066 |
| 2024/0116366 | A1 * | 4/2024 | Bin | H02P 27/06 |
| 2024/0182017 | A1 * | 6/2024 | Fujita | B60K 6/40 |
| 2025/0006958 | A1 * | 1/2025 | Williams | H01M 8/1004 |

FOREIGN PATENT DOCUMENTS

| | | | | |
|---|---|---|---|---|
| CN | 110027412 A * | 7/2019 | | B60L 3/003 |
| DE | 102023112198 A1 * | 4/2024 | | H02M 7/48 |
| JP | 2019122164 A * | 7/2019 | | B60L 3/0061 |
| JP | 6992517 B2 * | 1/2022 | | B60L 3/003 |

* cited by examiner

*Primary Examiner* — Pedro J Cuevas
(74) *Attorney, Agent, or Firm* — CANTOR COLBURN LLP

(57) ABSTRACT

A system performs a method for operating a vehicle. A cable is attached between an inverter of the vehicle and a motor of the vehicle, the cable having a resistance. The inverter is operated using a first direct current (DC) reference voltage. A processor obtains a current from the motor, calculates a power factor at the inverter, obtains a resistance of the cable, determines a voltage drop between the inverter and the motor from the current, the resistance and the power factor due to a presence of the cable, determines a DC compensation voltage from the voltage drop, and adjusts the first DC reference voltage to a second DC reference voltage using the DC compensation voltage.

20 Claims, 7 Drawing Sheets

METHOD FOR COMPENSATING ALTERNATING CURRENT CABLE LOSS

INTRODUCTION

The subject disclosure relates to setting an operating point for an electrical drive system of a vehicle and, in particular, to a system and method for setting an operating point that corrects for a resistance that is present when the vehicle is being calibrated but which is not present during normal operation of the vehicle.

A drive system of a vehicle operates by applying a direct current (DC) voltage from a power source to an inverter. The inverter converts the DC voltage to an alternating current (AC) voltage that can be used to operate a motor. The drive system can be calibrated to set the DC voltage from the power source to an appropriate DC voltage set point. During calibration, a dynamometer is used with the inverter and the motor to measure motor torque, motor speed and other motor parameters. The calibration setup includes the dynamometer and a long cable connected between the inverter and the motor and having a resistance that introduces a significant voltage drop at the motor, resulting in a difference between the DC voltage set point determined using the dynamometer and the DC voltage set point suitable for use by the vehicle once the cable (and dynamometer) is removed. Accordingly, it is desirable to adjust the DC voltage set point for the vehicle to correct for the voltage drop introduced by the resistance of the cable during calibration.

SUMMARY

In one exemplary embodiment, a method of operating a vehicle is disclosed. A cable is attached between an inverter of the vehicle and a motor of the vehicle, the cable having a resistance. The inverter is operated using a first direct current (DC) reference voltage. A current is measured at the motor. The resistance of the cable is obtained. A power factor at the inverter is calculated. A voltage drop is determined between the inverter and the motor from the current, the resistance and the power factor being due to a presence of the cable. A DC compensation voltage is determined from the voltage drop. The first DC reference voltage is adjusted to a second DC reference voltage using the DC compensation voltage.

In addition to one or more of the features described herein, adjusting the first DC reference voltage further includes adding the voltage drop to the first DC reference voltage when the vehicle is in a regeneration mode and subtracting the voltage drop from the first DC reference voltage when the vehicle is not in the regeneration mode.

In addition to one or more of the features described herein, the current is one of a phase current at the motor and a current command signal at the inverter.

In addition to one or more of the features described herein, the method further includes determining the DC compensation voltage from the voltage drop and a modulation index.

In addition to one or more of the features described herein, the method further includes determining the resistance of the cable based on at least one of a frequency of the motor, a temperature of the cable, and a length of the cable.

In addition to one or more of the features described herein, the current is obtained from the first DC reference voltage by one of a lookup table and an equation.

In addition to one or more of the features described herein, the method further includes disconnecting the cable and operating the vehicle using the second DC reference voltage.

In another exemplary embodiment, a system for operating a vehicle is disclosed. The system includes a processor configured to obtain a current from a motor of the vehicle operated by an inverter of the vehicle, the inverter being operated by a first direct current (DC) reference voltage, the motor having a cable attached, calculate a power factor at the inverter, obtain a resistance of the cable, determine a voltage drop between the inverter and the motor from the current, the resistance and the power factor due to a presence of the cable, determine a DC compensation voltage from the voltage drop, and adjust the first DC reference voltage to a second DC reference voltage using the DC compensation voltage.

In addition to one or more of the features described herein, the processor is further configured to adjust the first DC reference voltage by adding the voltage drop to the first DC reference voltage when the vehicle is in a regeneration mode and subtracting the voltage drop from the first DC reference voltage when the vehicle is not in the regeneration mode.

In addition to one or more of the features described herein, the current is one of a phase current at the motor and a current command signal at the inverter.

In addition to one or more of the features described herein, the processor is further configured to determine the DC compensation voltage from the voltage drop and a modulation index.

In addition to one or more of the features described herein, the processor is further configured to determine the resistance of the cable based on at least one of a frequency of the motor, a temperature of the cable, and a length of the cable.

In addition to one or more of the features described herein, the current is obtained from the first DC reference voltage by one of a lookup table and an equation.

In addition to one or more of the features described herein, the processor is further configured to operate the vehicle using the second DC reference voltage when the cable is disconnected from the motor.

In another exemplary embodiment, a vehicle is disclosed. The vehicle includes a processor configured to obtain a current from a motor of the vehicle operated by an inverter of the vehicle, the inverter being operated by a first direct current (DC) reference voltage, the motor having a cable attached, obtain a power factor at the inverter, obtain a resistance of the cable, determine a voltage drop between the inverter and the motor from the current, the resistance and the power factor due to a presence of the cable, determine a DC compensation voltage from the voltage drop, and adjust the first DC reference voltage to a second DC reference voltage using the DC compensation voltage.

In addition to one or more of the features described herein, the processor is further configured to adjust the first DC reference voltage by adding the voltage drop to the first DC reference voltage when the vehicle is in a regeneration mode and subtracting the voltage drop from the first DC reference voltage when the vehicle is not in the regeneration mode.

In addition to one or more of the features described herein, the current is one of a phase current at the motor and a current command signal at the inverter.

In addition to one or more of the features described herein, the processor is further configured to determine the DC compensation voltage from the voltage drop and a modulation index.

In addition to one or more of the features described herein, the processor is further configured to determine the resistance of the cable based on at least one of a frequency of the motor, a temperature of the cable, and a length of the cable.

In addition to one or more of the features described herein, the current is obtained from the first DC reference voltage by one of a lookup table and an equation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
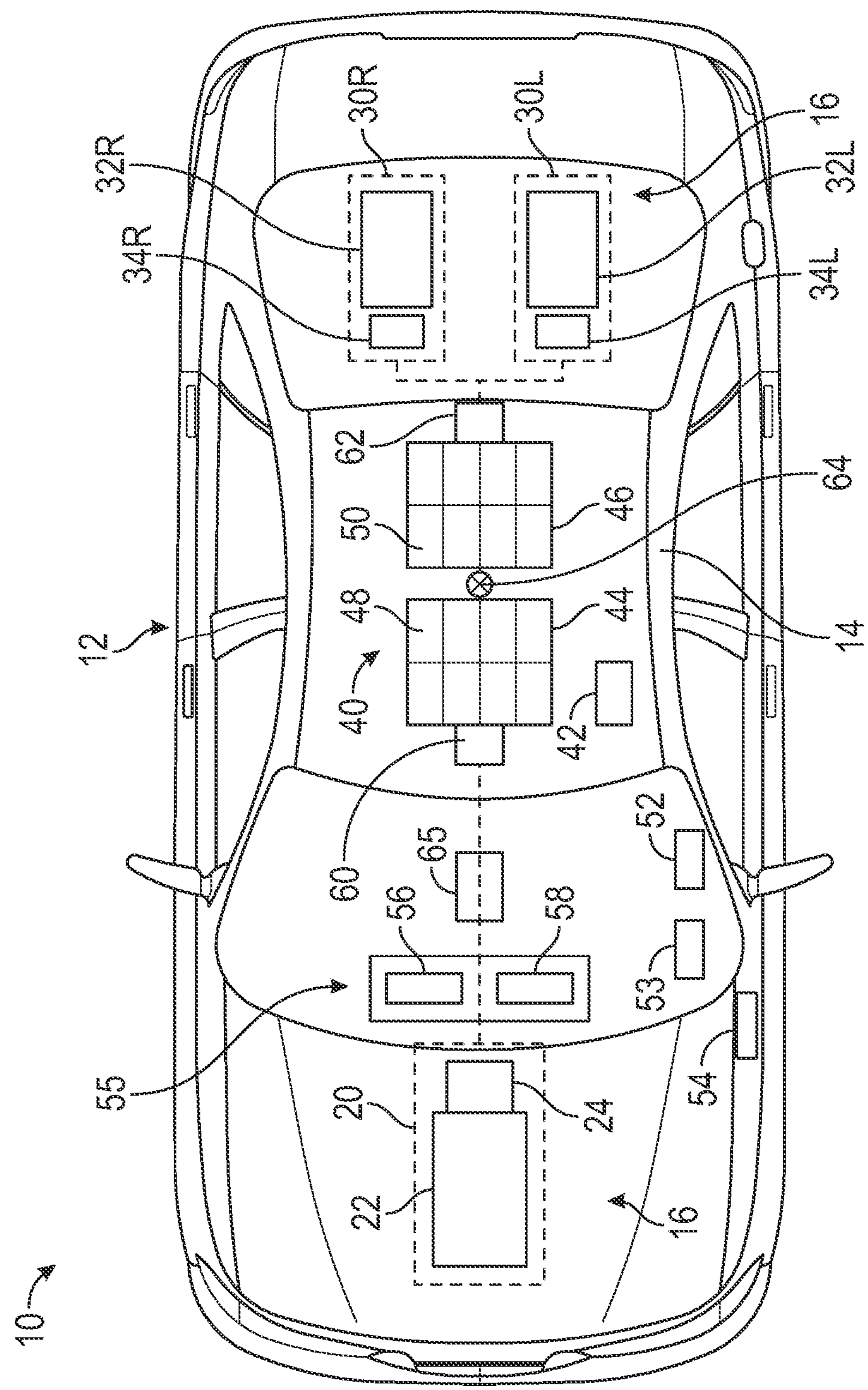
FIG. 1 shows an embodiment of a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

The vehicle 10 can operate in a regeneration mode in which electrical current generated at the wheels of the vehicle, generally during braking, can be used to charge one or more of the battery packs. The vehicle 10 can operate with the regeneration mode off or on.

As illustrated herein, the vehicle 10 is an electric vehicle. In an alternative embodiment, the vehicle 10 can be an internal combustion engine vehicle, a hybrid vehicle, etc.

Figure 2:
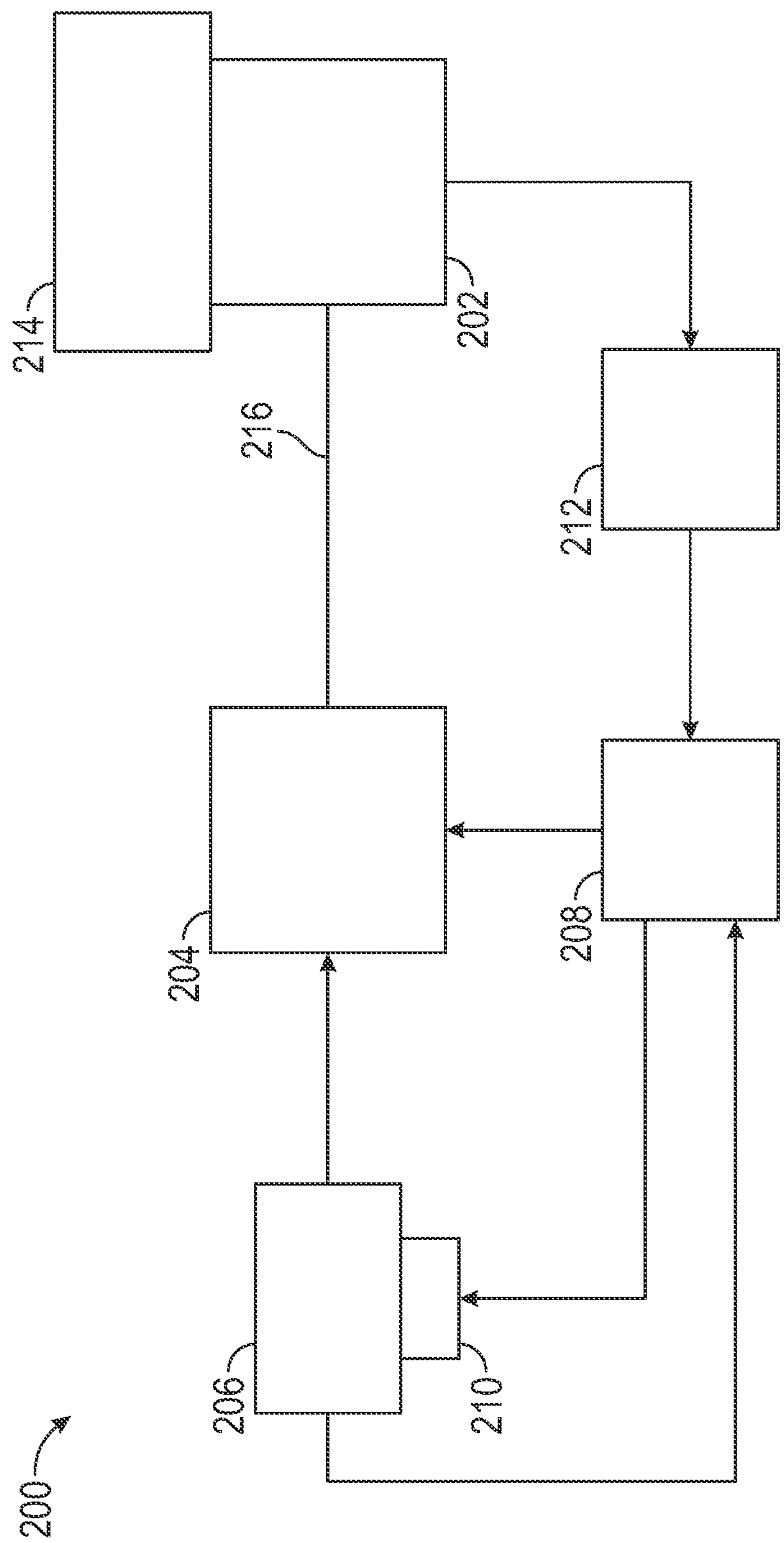
FIG. 2 shows block diagram of an electrical drive system for operation of a motor of the vehicle, in an embodiment.

FIG. 2 shows a block diagram of an electrical drive system 200 for operation of a motor of the vehicle 10, in an embodiment. The electrical drive system 200 includes an electric motor 202 and a traction power inverter module (TPIM) or inverter 204 that provides AC power to the electric motor 202 through AC cables. A power source 206 provides a DC reference voltage to the inverter 204, which converts the DC reference voltage to an alternating current (AC) voltage and AC current at the electric motor 202. A voltage controller 210 controls operation of the power source 206. A controller 208 controls operation of the inverter 204 and reads power and voltage from the battery. Various sensors 212 measure operating parameters of the electric motor 202, such as motor speed and motor current, and provide these measurements to the controller 208. In addition, various measurements from the inverter, such as inverter currents and inverter voltages, can be measured and provided to the controller 208.

The electrical drive system 200 is shown in a testing operation which is used for system calibration in which a dynamometer 214 is connected to the electric motor 202. The dynamometer 214 is used during calibration to set a DC voltage set point for the DC reference voltage supplied from the power source 206. The dynamometer 214 measures a torque at the electric motor 202. The calibration setup includes a cable 216 connected between the inverter 204 and the electric motor 202. Current flows from the inverter 204 to the electric motor 202 via the cable 216. The cable 216 has a resistance $R_{ca}$. Due to the length of the cable 216, the resistance of the cable is a significant factor in the testing circuit and affects the resulting DC voltage set point. The resistance $R_{ca}$ is dependent on a motor frequency and a temperature of the cable 216. The resistance of the cable 216 can be provided to the controller 208 during calibration.

The controller 208 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 208 may include a non-transitory computer-readable medium that stores instructions which, when processed by one or more processors of the controller 208, implement a method of controlling a DC reference voltage at the power source 206 that is compensated for a difference between operation of the motor during a calibration operation and operation of the motor when the vehicle is on the road, according to one or more embodiments detailed herein. The controller 208 can set the DC voltage set point at the voltage controller 210 to be suitable for when the vehicle is in operation with the cable (and dynamometer) removed.

Figure 3:
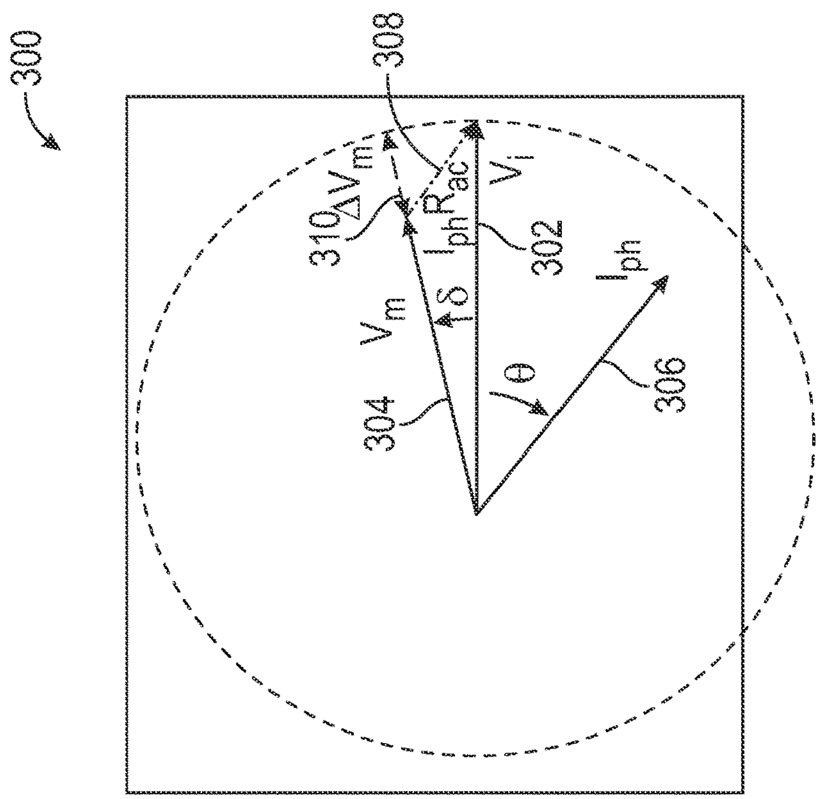
FIG. 3 shows a phasor diagram that shows various electrical parameters of the electrical drive system.

FIG. 3 shows a phasor diagram 300 that shows various electrical parameters of the electrical drive system 200. An inverter voltage phasor 302 ($V_i$) represents a voltage at an output of the inverter 204 and is shown aligned at zero degrees for illustrative purposes. A motor voltage phasor 304 ($V_m$) represents a voltage at the electric motor 202 and leads the inverter voltage phasor by an angle δ. A phase current 306 ($I_{ph}$) at the motor lags the inverter voltage phasor 302 ($V_i$) by an angle θ, where cos θ is a power factor between the phase current $I_{ph}$ and the inverter voltage $V_i$. A difference between the magnitude of the inverter voltage and the magnitude of the motor voltage is represented by resistance vector 308, which has magnitude $R_{ac}I_{ph}$. A voltage drop 310 ($\Delta V_m$) represents a difference between a magnitude of the inverter voltage phasor 302 ($V_i$) and a magnitude of the motor voltage phasor 304 ($V_m$), as shown in Eq. (1):

$$\Delta V_m = V_i - V_m \quad \text{Eq. (1)}$$

The voltage drop ($\Delta V_m$) can be calculated from the phasors shown in FIG. 3, as shown in Eq. (2)

$$\Delta V_m = V_m\left(1 - \frac{1}{\cos\delta}\right) + R_{ac}I_{ph}\frac{\cos\theta}{\cos\delta} \quad \text{Eq. (2)}$$

where $$\delta = \tan^{-1}\frac{I_{ph}R_{ac}\sin\theta}{V_i - I_{ph}R_{ac}\cos\theta} \quad \text{Eq. (3)}$$

Figure 4:
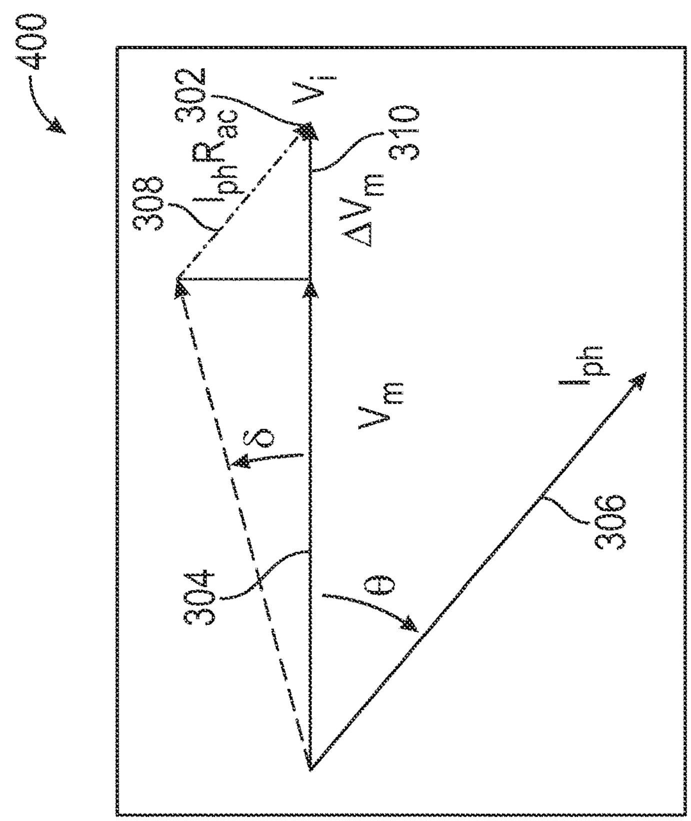
FIG. 4 shows a phasor diagram when the value of angle is small and approaches zero.

FIG. 4 shows a phasor diagram 400 when the value of angle δ is small and approaches zero. The motor voltage phasor 304 ($V_m$) becomes aligned with the inverter voltage phasor 302 ($V_i$). Thus, Eq. (2) can be rewritten as shown in Eq. (4):

$$V_m = V_i - I_{ph}R_{ac}\cos\theta \quad \text{Eq. (4)}$$

Figure 5:
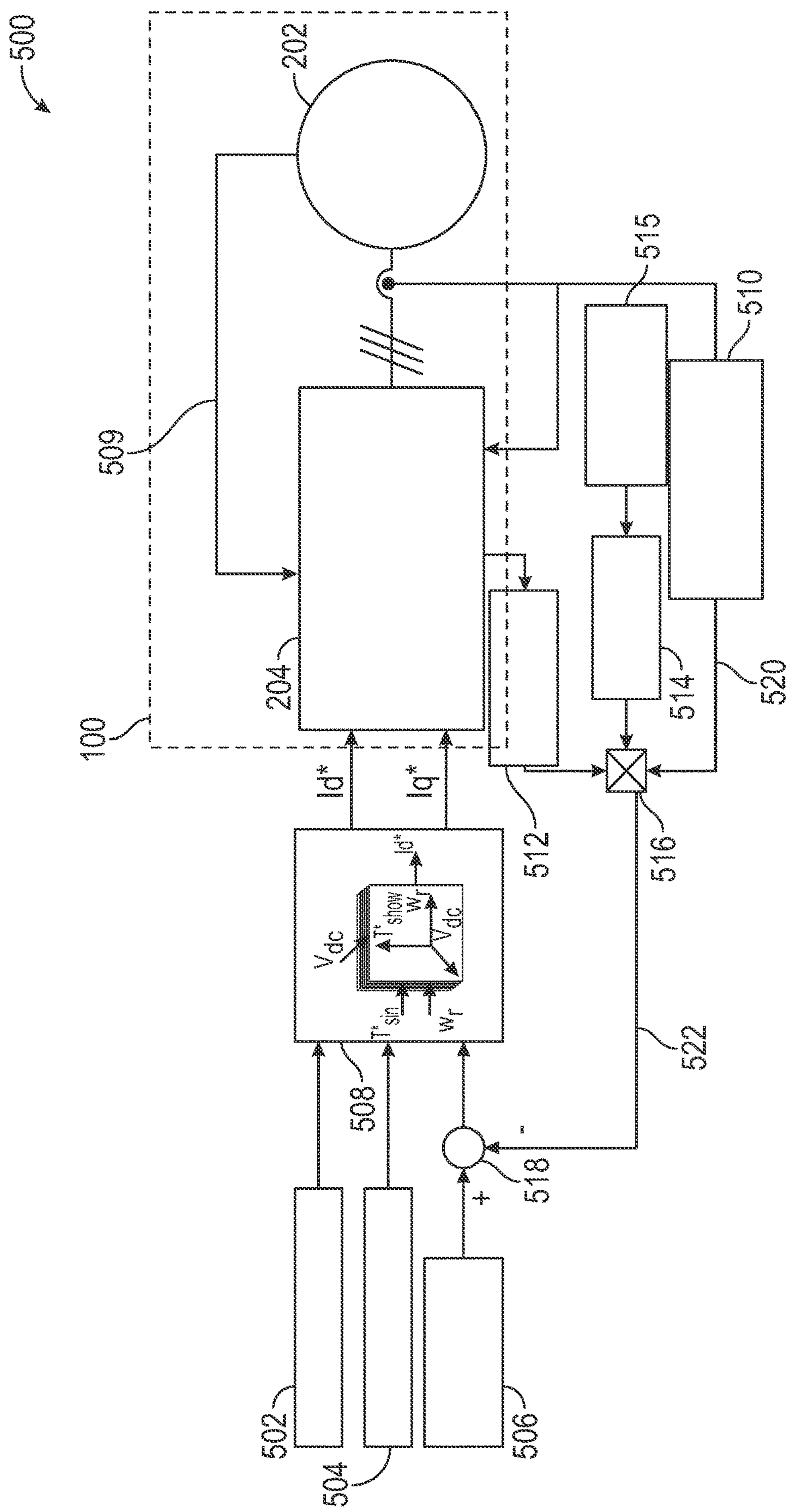
FIG. 5 shows a block diagram illustrating a method for setting an operating point for the vehicle to account for cable resistance, in an illustrative embodiment.

FIG. 5 shows a block diagram 500 illustrating a method for setting an operating point for the vehicle to account for cable resistance, in an illustrative embodiment. The method illustrated by the block diagram 500 can be performed in the controller 208 or another suitable processor. Parameters values are provided to the controller 208, the parameters including a torque command 502 a motor speed 504 and a DC reference voltage 506 ($V_{dc}$) of the power source 206. The torque command, the motor speed and the DC reference voltage are entered into a current command generator 508 at the controller 208 to produce current command signals. The current command signals include an in-phase current ($i_d$*) and a quadrature current ($i_q$*). In an embodiment, the current command generator 508 can be a lookup table that stores in-phase current ($i_d$*) and a quadrature current ($i_q$*) for different values of torque command 502, motor speed 504 and DC reference voltage 506. In an alternative embodiment, the current command generator 508 includes an equation into which the torque command 502, motor speed 504 and DC reference voltage 506 are input and which outputs the current command signals. The current command signals are used to calculate duty cycle values for the inverter 204.

The inverter 204 operates the electric motor 202 based on the current command signals. A motor position 509 of the electric motor 202 and the phase current 510 $I_{ph}$ at the motor can be used as feedback at the inverter 204. The phase current 510 $I_{ph}$ and a power factor (cos θ) 512 of the inverter 204 are provided to an error calculations circuit 516. An AC cable resistance 514 is also provided to the error calculations circuit 516. The AC cable resistance 514 can be dependent on cable parameters 515 such as motor speed and temperature. The error calculations circuit 516 calculates a DC compensation voltage $\Delta V_{dc}$ 522 based on these inputs.

The DC compensation voltage $\Delta V_{ac}$ is related to the voltage drop ($\Delta V_m$) by a modulation index m*. The modulation index relates a voltage at the motor to the reference voltage level the power source, as shown in Eq. (5):

$$m^* = \frac{V_m}{V_{dc}} \quad \text{Eq. (5)}$$

The modulation index m* remains constant between when the vehicle is being calibrated and when the vehicle is being normally operated. The constancy of the modulation index ensures consistency of the operating point of the motor. Thus:

$$m^* = \frac{V_{m1}}{V_{dc1}} = \frac{V_{m2}}{V_{dc2}} \quad \text{Eq. (6)}$$

The index=1 for a first scenario when the dynamometer 214 is attached to the motor for calibration operation. The index=2 for a second scenario for normal operation of the vehicle on the road. A DC compensation voltage $\Delta V_{dc}$ is a difference between a first reference point $V_{dc1}$ suitable for operating the vehicle during calibration and a second DC reference point $V_{dc2}$ suitable for operating the vehicle when the dynamometer and cable are removed, as shown in Eq. (7):

$$\Delta V_{dc} = V_{dc2} - V_{dc1} \quad \text{Eq. (7)}$$

Eq. (7) can be restated using Eq. (6), as shown in Eq. (8):

$$\Delta V_{dc} = \frac{V_{m2}}{m^*} - \frac{V_{m1}}{m^*} \quad \text{Eq. (8)}$$

The second motor voltage $V_{m2}$ can be replaced, as shown by Eq. (9):

$$\Delta V_{dc} = \frac{V_{m1} + I_{ph}R_{ac}\cos\theta}{m^*} - \frac{V_{m1}}{m^*} \quad \text{Eq. (9)}$$

which reduces to Eq. (10)

$$\Delta V_{dc} = \frac{I_{ph}R_{ac}\cos\theta}{m^*} \quad \text{Eq. (10)}$$

Eq. (10) can be rewritten as shown in Eq. (11):

$$\Delta V_{dc} = k_m I_{ph}R_{ac}\cos\theta \quad \text{Eq. (11)}$$

where km is the reciprocal of the modulation index m*.

After calibration and during normal operation of the vehicle, the voltage summing circuit 518 adds the DC compensation voltage to the first DC reference voltage ($V_{dc}$+$\Delta V_{dc}$) to obtain an updated reference voltage. The updated reference voltage can then be used in a subsequent cycle when selecting current command signals from the current command generator 508.

Figure 6:
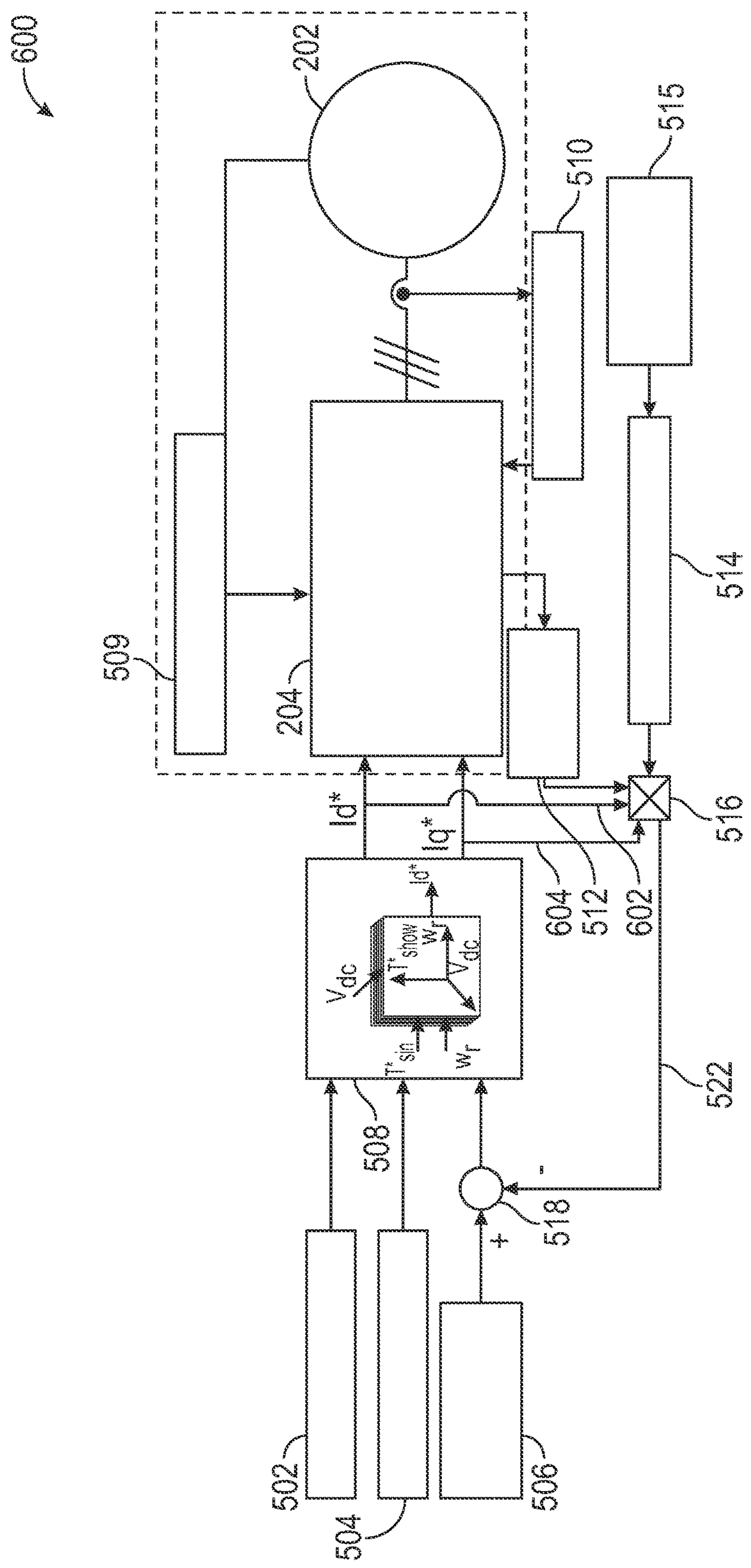
FIG. 6 shows a block diagram illustrating a flow of calculations for setting an operating point for the vehicle to account for cable resistance, in an alternative embodiment.

FIG. 6 shows a block diagram 600 illustrating a flow of calculations for setting an operating point for the vehicle 10 to account for cable resistance, in an alternative embodiment. The current command signals (i.e., the in-phase current ($i_d$*) and the quadrature current ($i_q$*)) are provided directly to the error calculations circuit 516. The error calculations circuit 516 calculates the phase current $I_{ph}$ from Eq. (12):

$$I_{ph} = \sqrt{(i_d^*)^2 + (i_q^*)^2} \quad \text{Eq. (12)}$$

Subsequent calculations produce the updated DC reference voltage.

Figure 7:
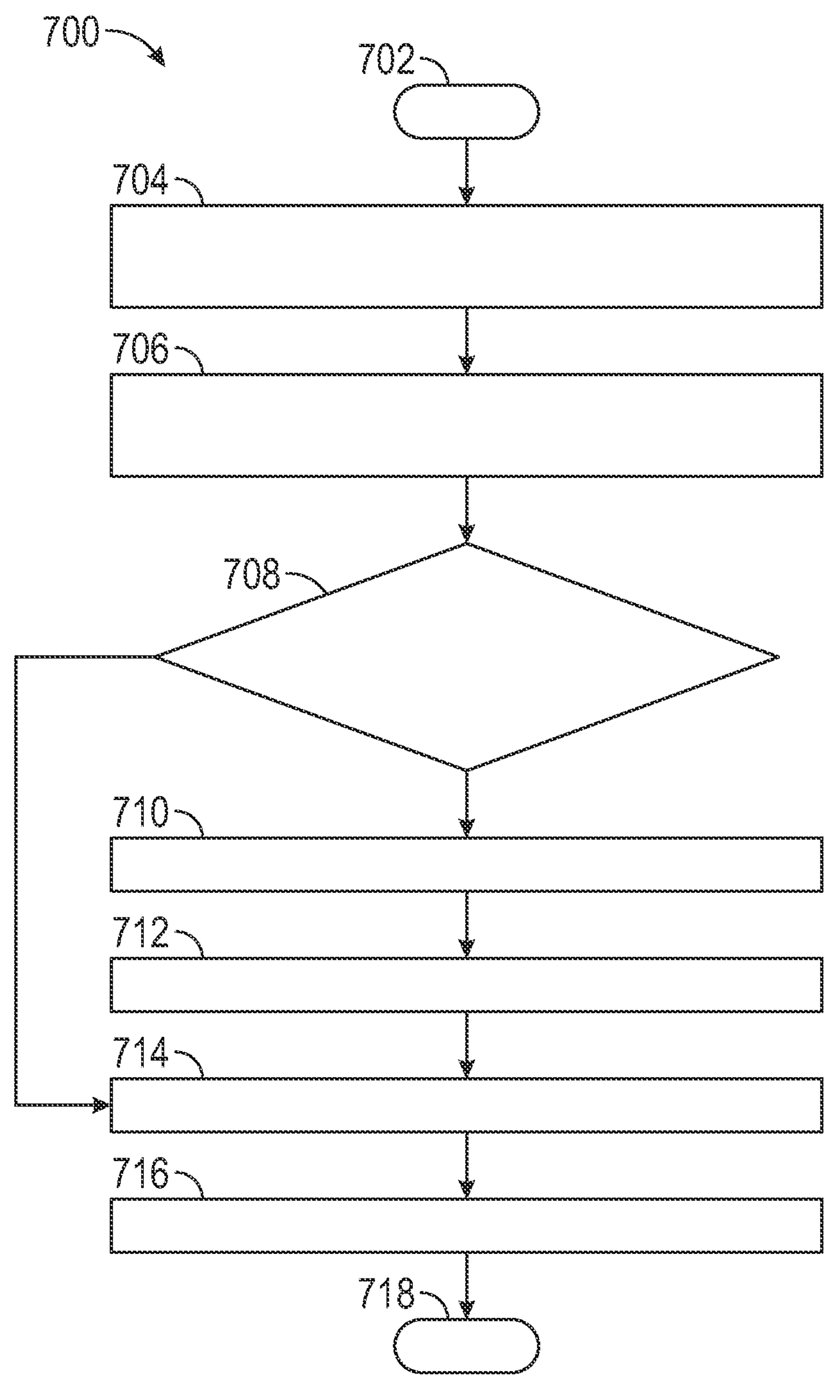
FIG. 7 is a flowchart of a calibration method involving the dynamometer.

FIG. 7 is a flowchart 700 of a calibration method involving the dynamometer. The method begins in box 702. In box 704, the motor is calibrated using the dynamometer with an AC cable connected between the motor and the inverter. In box 706, the resistance of the AC cable is measured at different motor speeds and motor currents. In box 708, a decision is made with respect to the length of the AC cable. If the length of the AC cable is the same as a length of cable used in the vehicle during standard operation, the method proceeds to box 714. Otherwise, the method proceeds to box 710. In box 710, the calibration resistance is updated by determining a new resistance value based on a difference of the AC cable resistance between the inverter and the motor on the dynamometer and the resistance with the dynamometer removed. In box 712, a DC compensation voltage $\Delta V_{dc}$ is determined using on the updated resistance of the cable. In box 714, the calibrated voltage is validated at the vehicle and implemented into DC reference voltage for normal operation of the vehicle. In box 716, the final calibration for the vehicle is released. The method ends at box 718.

Figure 8:
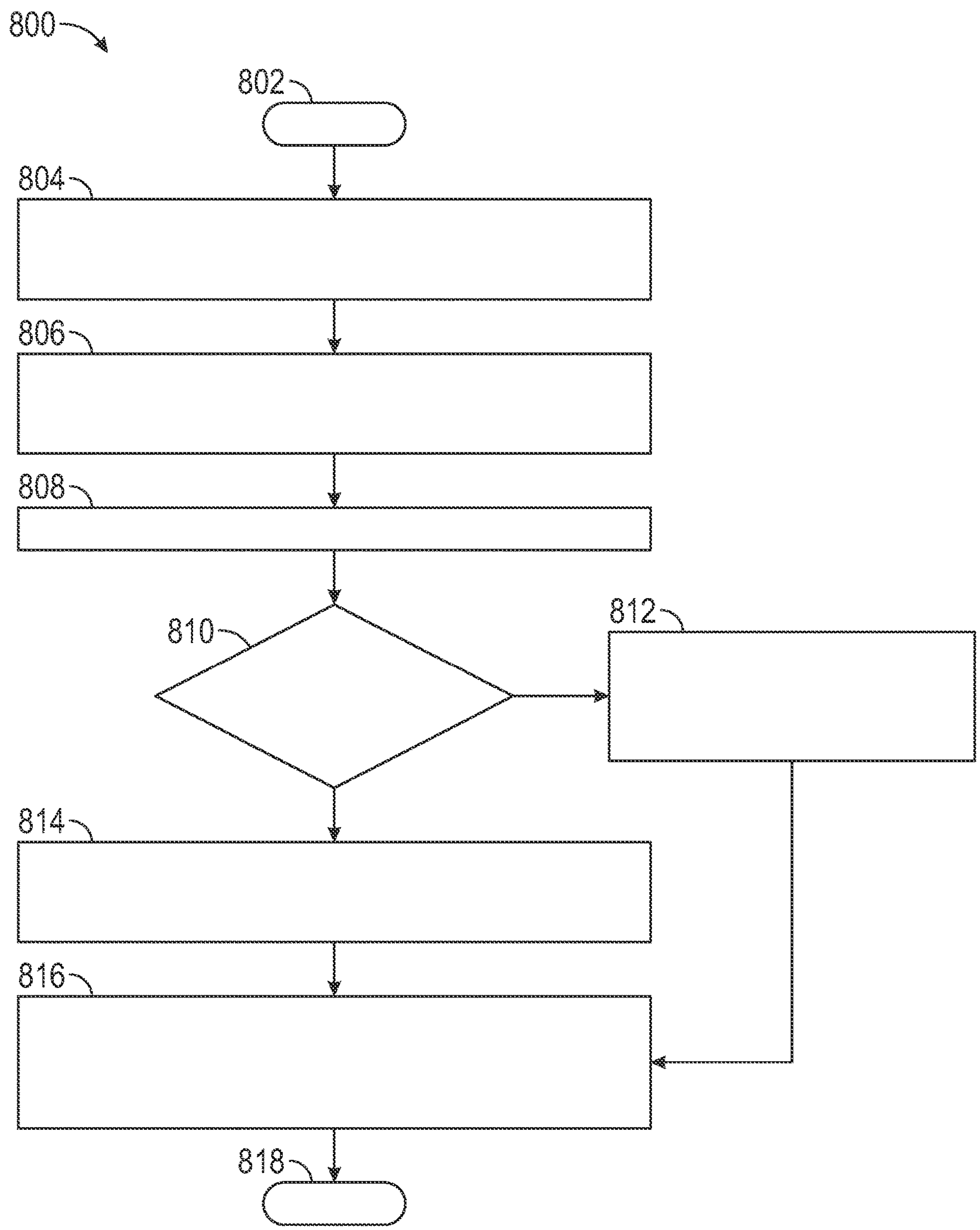
FIG. 8 is a flowchart of method for determining a calibration voltage.

FIG. 8 is a flowchart 800 of method for determining a calibration voltage. The flowchart 800 shows details of the operation that occurs in box 712 of the flowchart 700. The method begins in box 802. In box 804, a DC voltage is measured at the inverter. In box 806, a power factor and a phase current are calculated. The phase current can be calculated using the current command signals ($i_d$*, $i_q$*) or can be measured using current sensors (not shown). In box 808, the DC compensation voltage $\Delta V_{dc}$ is calculated using, for example, Eq. (13).

In box 810, a check is made of the regeneration mode of the vehicle 10. If the regeneration mode is on, the method proceeds to box 812. Otherwise (i.e., regeneration mode is off), the method proceeds to box 814. In box 812, the DC compensation voltage is added to the first DC reference voltage (i.e., $V_{dc}+\Delta V_{dc}$) to obtain a second DC reference voltage. In box 814, the DC compensation voltage is subtracted from the first DC reference voltage (i.e., $V_{dc}-\Delta V_{dc}$) to obtain a second DC reference voltage. From either box 812 or box 814, the method proceeds to box 816. In box 816, the new reference voltage is used at the current command generator (along with motor torque and motor speed) to determine the current command signals ($i_d$*, $i_q$*). The method ends at box 818.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
attaching a cable between an inverter of the vehicle and a motor of the vehicle, the cable having a resistance;
operating the inverter using a first direct current (DC) reference voltage;
measuring a current at the motor;
obtaining the resistance of the cable;
calculating a power factor at the inverter;
determining a voltage drop between the inverter and the motor from the current, the resistance and the power factor due to a presence of the cable;
determining a DC compensation voltage from the voltage drop; and
adjusting the first DC reference voltage to a second DC reference voltage using the DC compensation voltage.

2. The method of claim 1, wherein adjusting the first DC reference voltage further comprises adding the voltage drop to the first DC reference voltage when the vehicle is in a regeneration mode and subtracting the voltage drop from the first DC reference voltage when the vehicle is not in the regeneration mode.

3. The method of claim 1, wherein the current is one of: (i) a phase current at the motor; and (ii) a current command signal at the inverter.

4. The method of claim 1, further comprising determining the DC compensation voltage from the voltage drop and a modulation index.

5. The method of claim 1, further comprising determining the resistance of the cable based on at least one of: (i) a frequency of the motor; (ii) a temperature of the cable; and (ii) a length of the cable.

6. The method of claim 1, wherein the current is obtained from the first DC reference voltage by one of: (i) a lookup table; and (ii) an equation.

7. The method of claim 1, further comprising disconnecting the cable and operating the vehicle using the second DC reference voltage.

8. A system for operating a vehicle, comprising:
a processor configured to:
obtain a current from a motor of the vehicle operated by an inverter of the vehicle, the inverter being operated by a first direct current (DC) reference voltage, the motor having a cable attached;
calculate a power factor at the inverter;
obtain a resistance of the cable;
determine a voltage drop between the inverter and the motor from the current, the resistance and the power factor due to a presence of the cable;
determine a DC compensation voltage from the voltage drop; and adjust the first DC reference voltage to a second DC reference voltage using the DC compensation voltage.

9. The system of claim 8, wherein the processor is further configured to adjust the first DC reference voltage by adding the voltage drop to the first DC reference voltage when the vehicle is in a regeneration mode and subtracting the voltage drop from the first DC reference voltage when the vehicle is not in the regeneration mode.

10. The system of claim 8, wherein the current is one of: (i) a phase current at the motor; and (ii) a current command signal at the inverter.

11. The system of claim 8, wherein the processor is further configured to determine the DC compensation voltage from the voltage drop and a modulation index.

12. The system of claim 8, wherein the processor is further configured to determine the resistance of the cable based on at least one of: (i) a frequency of the motor; (ii) a temperature of the cable; and (ii) a length of the cable.

13. The system of claim 8, wherein the current is obtained from the first DC reference voltage by one of: (i) a lookup table; and (ii) an equation.

14. The system of claim 8, wherein the processor is further configured to operate the vehicle using the second DC reference voltage when the cable is disconnected from the motor.

15. A vehicle, comprising:

a processor configured to:

obtain a current from a motor of the vehicle operated by an inverter of the vehicle, the inverter being operated by a first direct current (DC) reference voltage, the motor having a cable attached;

obtain a power factor at the inverter;

obtain a resistance of the cable;

determine a voltage drop between the inverter and the motor from the current, the resistance and the power factor due to a presence of the cable;

determine a DC compensation voltage from the voltage drop; and adjust the first DC reference voltage to a second DC reference voltage using the DC compensation voltage.

16. The vehicle of claim 15, wherein the processor is further configured to adjust the first DC reference voltage by adding the voltage drop to the first DC reference voltage when the vehicle is in a regeneration mode and subtracting the voltage drop from the first DC reference voltage when the vehicle is not in the regeneration mode.

17. The vehicle of claim 15, wherein the current is one of: (i) a phase current at the motor; and (ii) a current command signal at the inverter.

18. The vehicle of claim 15, wherein the processor is further configured to determine the DC compensation voltage from the voltage drop and a modulation index.

19. The vehicle of claim 15, wherein the processor is further configured to determine the resistance of the cable based on at least one of: (i) a frequency of the motor; (ii) a temperature of the cable; and (ii) a length of the cable.

20. The vehicle of claim 15, wherein the current is obtained from the first DC reference voltage by one of: (i) a lookup table; and (ii) an equation.

* * * * *